(12) United States Patent
Nakayama

(10) Patent No.: US 11,225,378 B2
(45) Date of Patent: Jan. 18, 2022

(54) BUFFER DEVICE

(71) Applicant: IHI Corporation, Tokyo (JP)

(72) Inventor: Takayuki Nakayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/557,434

(22) Filed: Aug. 30, 2019

(65) Prior Publication Data

US 2019/0382202 A1 Dec. 19, 2019

Related U.S. Application Data

(63) Continuation of application No. PCT/JP2018/006277, filed on Feb. 21, 2018.

(30) Foreign Application Priority Data

Apr. 20, 2017 (JP) .............................. JP2017-083717

(51) Int. Cl.
*B65G 1/10* (2006.01)
*B65G 1/02* (2006.01)
*B65G 1/137* (2006.01)

(52) U.S. Cl.
CPC .............. *B65G 1/10* (2013.01); *B65G 1/023* (2013.01); *B65G 1/1373* (2013.01); *B65G 2203/02* (2013.01)

(58) Field of Classification Search
CPC ........ B65G 1/10; B65G 1/023; B65G 1/1373; B65G 1/1378; B65G 1/0485; B65G 1/0492; B65G 1/1376; B65G 1/0428; B65G 1/00; B65G 63/02; B65G 37/005; B65G 37/02; B65G 47/02; B65G 47/04; B65G 47/1478; B65G 47/1485; B65G 47/52; B65G 47/90; B65G 47/901; B65G 47/902;

(Continued)

(56) References Cited

U.S. PATENT DOCUMENTS 4,293,272 A * 10/1981 Jellema .................. B65G 61/00
414/744.5
4,773,807 A * 9/1988 Kroll .................... B65G 1/0485
414/266

(Continued)

FOREIGN PATENT DOCUMENTS

CN 102725213 B 8/2016
DE 102011014394 A1 9/2012
(Continued)

*Primary Examiner* — Glenn F Myers
(74) *Attorney, Agent, or Firm* — Rothwell, Figg, Ernst & Manbeck, P.C.

(57) ABSTRACT

The present disclosure provides a buffer device for temporarily storing an article container for containing an article to be picked up, including: a placing unit on which the article container is placed and which is configured to transport the placed article container in a direction away from a pick-up area; a supply unit which supplies the article container from the pick-up area to an end area on a side of the placing unit close to the pick-up area; a movable carriage unit which is configured to travel in a transport direction of the article container in the placing unit and which allows the article container to be placed; and a transfer device which transfers the article container at least between the placing unit and the movable carriage unit.

10 Claims, 3 Drawing Sheets

(58) Field of Classification Search
CPC .. B65G 47/904; B65G 47/905; B65G 47/907; B65G 47/908; B65G 47/91; B65G 47/92; B25J 9/0093
See application file for complete search history.

(56) References Cited

U.S. PATENT DOCUMENTS

| | | | |
|---|---|---|---|
| 5,333,983 A | | 8/1994 | Hatouchi et al. |
| 2006/0245858 A1* | | 11/2006 | Suess ................ B65G 1/06 414/277 |
| 2010/0316468 A1 | | 12/2010 | Lert et al. |
| 2010/0316469 A1 | | 12/2010 | Lert et al. |
| 2010/0316470 A1 | | 12/2010 | Lert et al. |
| 2010/0322747 A1 | | 12/2010 | Lert et al. |
| 2011/0153065 A1 | | 6/2011 | Tomioka et al. |
| 2013/0031876 A1 | | 2/2013 | Fritzsche |
| 2014/0124462 A1* | | 5/2014 | Yamashita ........ B65G 1/1378 211/1.57 |
| 2016/0023853 A1* | | 1/2016 | Gaenz ............... B65G 1/0485 414/799 |
| 2016/0130085 A1* | | 5/2016 | Yamashita ........ B65G 1/1373 414/807 |
| 2016/0130086 A1 | | 5/2016 | Yamashita |
| 2016/0244262 A1* | | 8/2016 | O'Brien ............. G06Q 10/087 |

FOREIGN PATENT DOCUMENTS

| | | | | |
|---|---|---|---|---|
| EP | 1452462 | A2 | 9/2004 | |
| JP | 05-39103 | A | 2/1993 | |
| JP | 05-213413 | A | 8/1993 | |
| JP | 06-127639 | A | 5/1994 | |
| JP | 08-217209 | A | 8/1996 | |
| JP | 2000001220 | A * | 1/2000 | ........... B65G 57/005 |
| JP | 2002-193403 | A | 7/2002 | |
| JP | 3745607 | B | 2/2006 | |
| JP | 4084240 | B | 4/2008 | |
| JP | 2015-048195 | A | 3/2015 | |
| JP | 2015-199563 | A | 11/2015 | |
| JP | 2016-526520 | A | 9/2016 | |
| JP | 6040893 | B | 12/2016 | |
| TW | I460113 | B | 11/2014 | |
| TW | I525025 | B | 3/2016 | |
| TW | I557046 | B | 11/2016 | |
| WO | 2010/118412 | A1 | 10/2010 | |
| WO | 2011104159 | A1 | 9/2011 | |

* cited by examiner

BUFFER DEVICE

CROSS REFERENCE TO RELATED APPLICATIONS

The present application is a continuation application of International Application No. PCT/JP2018/006277, filed Feb. 21, 2018, which claims priority to Japanese Patent Application No. 2017-083717, filed Apr. 20, 2017. The contents of these applications are incorporated herein by reference in their entirety.

TECHNICAL FIELD

The present disclosure relates to a buffer device.

In a distribution facility, a buffer device may be provided, in which an article container containing various articles is transported from a warehouse to a pick-up transport unit, and the pick-up transport unit picks up the articles. In the buffer device, the article container is transported from the warehouse to the pick-up transport unit using a conveyor or the like. For example, Patent Document 1 discloses a sequential transport system which sequentially transports articles from a warehouse to a transport destination (pick-up position). The sequential transport system of Patent Document 1 uses a transport movable vehicle to transport the articles to a transport destination in a transfer order set in advance. Such techniques are also disclosed in Patent Documents 2 to 4.

DOCUMENTS OF THE RELATED ART

Patent Document

[Patent Document 1] Japanese Unexamined Patent Application, First Publication No. 2015-048195
[Patent Document 2] Japanese Unexamined Patent Application, First Publication No. H08-217209
[Patent Document 3] Japanese Unexamined Patent Application, First Publication No. H05-213413
[Patent Document 4] Japanese Unexamined Patent Application, First Publication No. H06-127639

SUMMARY

However, due to speeding up of pick-up operation, supply of the article container to the pick-up area by the buffer device may be delayed, which may cause trouble in the pick-up operation. In a system which moves an article container using a transport movable vehicle such as a conveyor, as in the sequential transport system disclosed in Patent Document 1, speeding up of the transport to the pick-up position is limited. Further, in the pick-up operation, it is inefficient to stock the article container containing articles that are frequently taken out in the warehouse after the pick-up operation is completed.

The present disclosure is made, referring to the problems stated above, to efficiently and quickly supply the article container to the pick-up area.

The present disclosure employs, as first aspect solving for such problems, a buffer device for temporarily storing an article container for containing an article to be picked up, including: a placing unit on which the article container is placed and which is configured to transport the placed article container in a direction away from a pick-up area; a supply unit which supplies the article container from the pick-up area to an end area on a side of the placing unit close to the pick-up area; a movable carriage unit which is configured to travel in a transport direction of the article container in the placing unit and which allows the article container to be placed thereon; and a transfer device which transfers the article container at least between the placing unit and the movable carriage unit.

As second aspect for solving the problems, in the first aspect, a plurality of the placing units may be provided.

As third solution for solving the problems, in the second aspect, the plurality of placing units may be disposed in parallel with each other in a state where a traveling area of the movable carriage unit is interposed between the plurality of the placing units.

As fourth aspect for solving the problems, a collect device which collects the article container from an end area on a side of the placing unit far from the pick-up area may be provided.

As fifth aspect for solving the problems, in any one of the first to fourth aspect, a containing unit which contains a plurality of the article containers may be provided separately from the placing unit.

According to the present disclosure, the article containers for which the pick-up operation has been completed are arranged in a last-in-first-out manner with respect to a movable storage apparatus, and are gradually transported to a warehouse. Accordingly, the article containers frequently needed are always disposed in the vicinity of the pick-up area. Furthermore, the article container can be efficiently and quickly supplied to the pick-up area by transporting the article container from the movable storage apparatus to the pick-up area at a high speed by a moving device.

DETAILED DESCRIPTION

Figure 1:
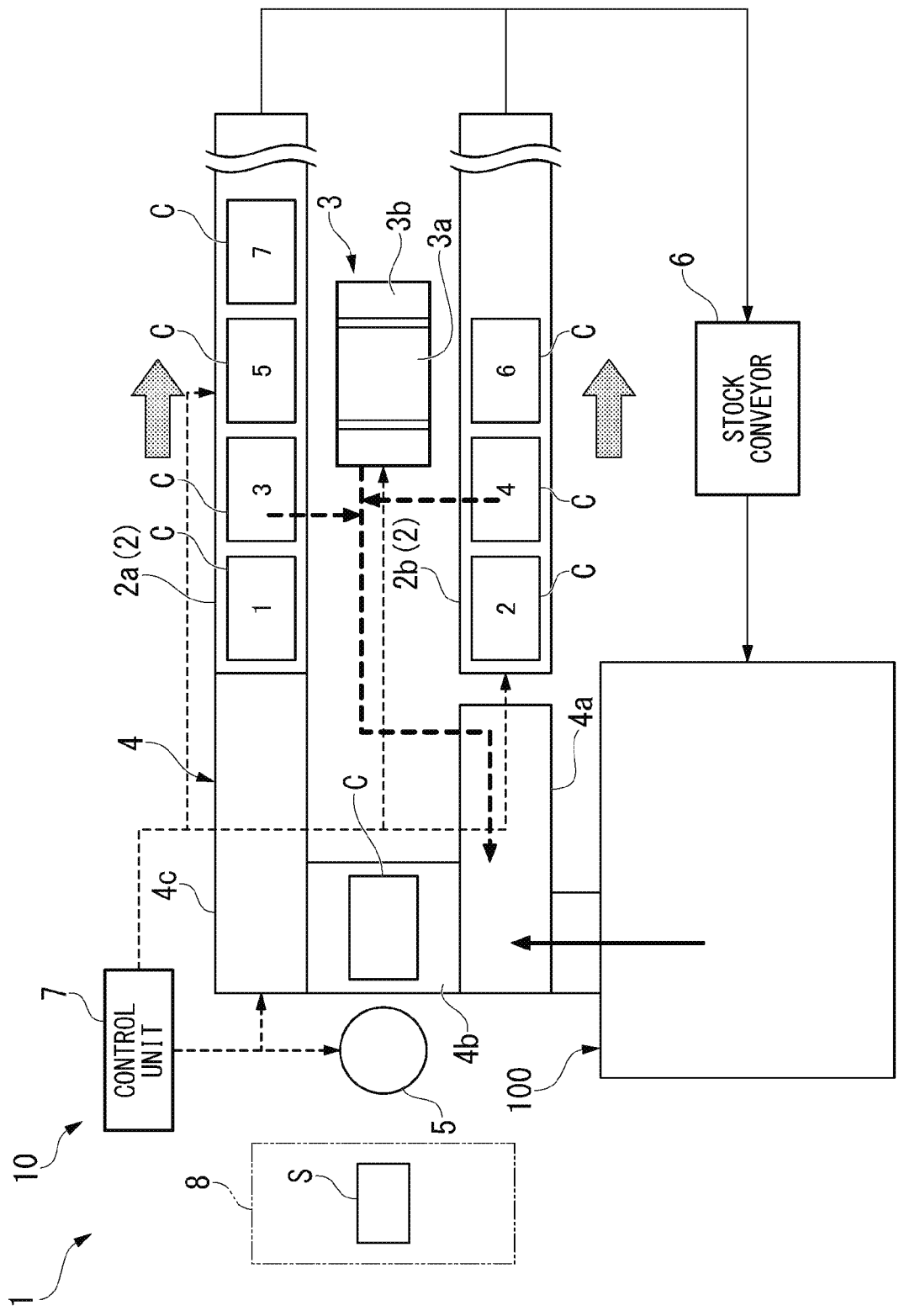
FIG. 1 is a schematic view showing a pick-up facility and an automatic warehouse including a buffer device according to an embodiment of the present disclosure.
Figure 2:
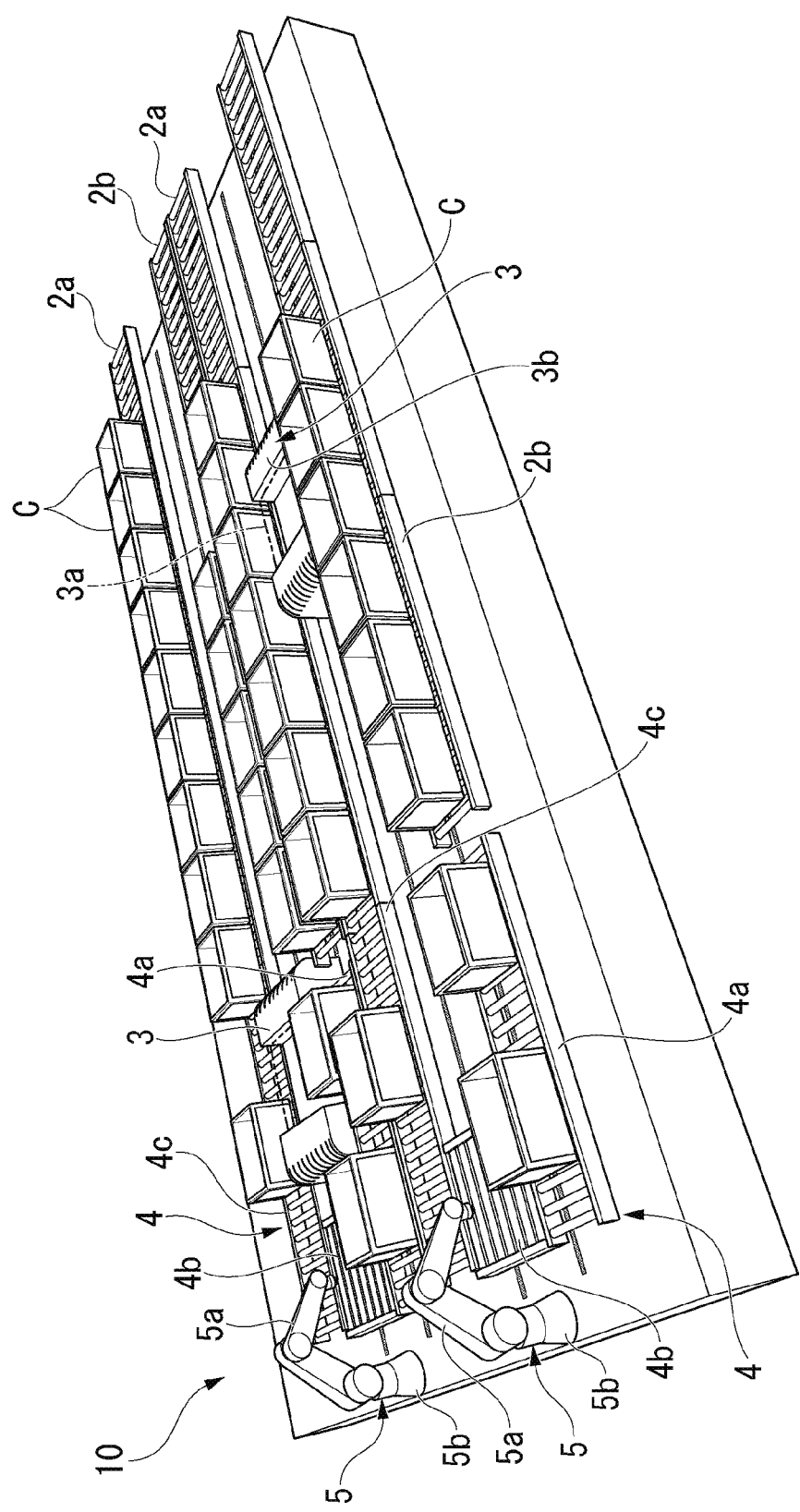
FIG. 2 is a perspective view showing the buffer device according to the embodiment of the present disclosure.

Hereinafter, an embodiment of a buffer device according to the present disclosure will be described with reference to the drawings. In the following drawings, a scale of each member is appropriately changed in order to adjust each member to a recognizable size. FIG. 1 is a schematic view showing a pick-up facility 1 and an automatic warehouse 100 including a buffer device 10 of the present embodiment. FIG. 2 is a perspective view showing the buffer device 10 of the present embodiment.

As shown in FIG. 1, the pick-up facility 1 is a facility that carries out a pick-up operation of picking up an article from a pick-up case C (article container) received from the automatic warehouse 100. Further, the pick-up facility 1 includes two storage conveyors 2 (placing unit), a movable shuttle 3, a pick-up transport unit 4, a pick-up robot 5, a stock conveyor 6 (collect device), a control unit 7, and a cargo case transport unit 8. Among the units constituting the pick-up facility 1, the buffer device 10 according to the present disclosure is composed of the storage conveyor 2, the movable shuttle 3, the pick-up transport unit 4, the stock conveyor 6, and the control unit 7. A plurality of articles are contained in the pick-up case C used in the pick-up facility 1 of the present embodiment.

The pick-up facility 1 includes, as the storage conveyors 2, a first storage conveyor 2a which is connected to the automatic warehouse 100 at an upstream end and connected to the stock conveyor 6 at a downstream end, and a second storage conveyor 2b which is connected to the stock conveyor 6 at a downstream end. The first storage conveyor 2a and the second storage conveyor 2b are roller conveyors which are disposed in parallel with each other in a state where a traveling path (traveling area) of the movable shuttle 3 are interposed between the first storage conveyor 2a and the second storage conveyor 2b and which move in one direction only. Moreover, the first storage conveyor 2a and the second storage conveyor 2b transport the pick-up cases C, for which the pick-up operation has been completed, toward the automatic warehouse 100 via the stock conveyor 6. Furthermore, the first storage conveyor 2a and the second storage conveyor 2b move the pick-up cases C one by one toward a side of the stock conveyor 6 (a direction separating from the pick-up area). Additionally, the first storage conveyor 2a and the second storage conveyor 2b can alternately transport the pick-up cases C toward the stock conveyor 6 each time the pick-up operation is completed.

The movable shuttle 3 is a moving device including a carriage 3a (movable carriage unit) on which the pick-up case C is placed and which is movable, an arm 3b (transfer device) which holds the pick-up case C from both sides on a longitudinal direction of the pick-up case C, and a drive mechanism (not shown). Further, the movable shuttle 3 is disposed between the first storage conveyor 2a and the second storage conveyor 2b, and can travel along a transport direction of the first storage conveyor 2a and the second storage conveyor 2b, thereby moving the storage conveyors 2 and the pick-up transport unit 4. Such a movable shuttle 3 is a device for transporting the pick-up case C based on an instruction from the control unit 7, which transports the pick-up case C by placing the pick-up case C gripped by the arm 3b on the carriage 3a and moving the carriage 3a on which the pick-up case C is placed.

The pick-up transport unit 4 includes a delivery conveyor 4a connected to the automatic warehouse 100, a pick-up area 4b where the pick-up operation is carried out, and a connection conveyor 4c (supply unit) connected to the pick-up area 4b and the first storage conveyor 2a. The delivery conveyor 4a is a roller conveyor which transports the pick-up case C delivered from the automatic warehouse 100 to the pick-up area 4b. Further, a direction change device (not shown) is provided at the delivery conveyor 4a, and the pick-up case C placed on the delivery conveyor 4a can be transferred to the pick-up area 4b. The pick-up area 4b is a holder having a space where the pick-up robot 5 carries out the pick-up operation, and has a driving device for transferring the pick-up case C onto the connection conveyor 4c. The connection conveyor 4c is a conveyer which is connected to the end of the first storage conveyor 2a and transports the pick-up case C for which the pick-up operation has been completed to the first storage conveyor 2a. The pick-up transport unit 4 moves the pick-up case C based on the instruction from the control unit 7.

As shown in FIG. 2, the pick-up robot 5 is a robot which has an arm unit 5a for holding and moving the article in the pick-up case C, and a support 5b for supporting the arm unit 5a. The pick-up robot 5 is a robot that carries out the pick-up operation to contain the articles contained in the pick-up case C in a cargo case S shown in FIG. 1 based on an instruction from the control unit 7.

The stock conveyor 6 is a conveyer which is connected to the downstream ends of the first storage conveyor 2a and the second storage conveyor 2b and is connected to a stock port of the automatic warehouse 100. The stock conveyor 6 moves at a high speed compared to those of the first storage conveyor 2a and the second storage conveyor 2b, and transports the pick-up cases C collected from the first storage conveyor 2a and the second storage conveyor 2b to the automatic warehouse 100.

The control unit 7 is a control device that stores a pick-up operation schedule and controls the storage conveyors 2, the movable shuttle 3, the delivery conveyor 4a, the pick-up robot 5 and the stock conveyor 6 based on the schedule. The cargo case transport unit 8 is a device for transporting the cargo case S, and is provided opposite to the pick-up transport unit 4 with the pick-up robot 5 interposed therebetween.

The pick-up facility 1 of the present embodiment is a facility for containing the articles contained in the pick-up cases C in the cargo case S shown in FIG. 1, based on a plan of the pick-up operation. The cargo case S is transported to the pick-up robot 5 by the cargo case transport unit 8.

Figure 3:
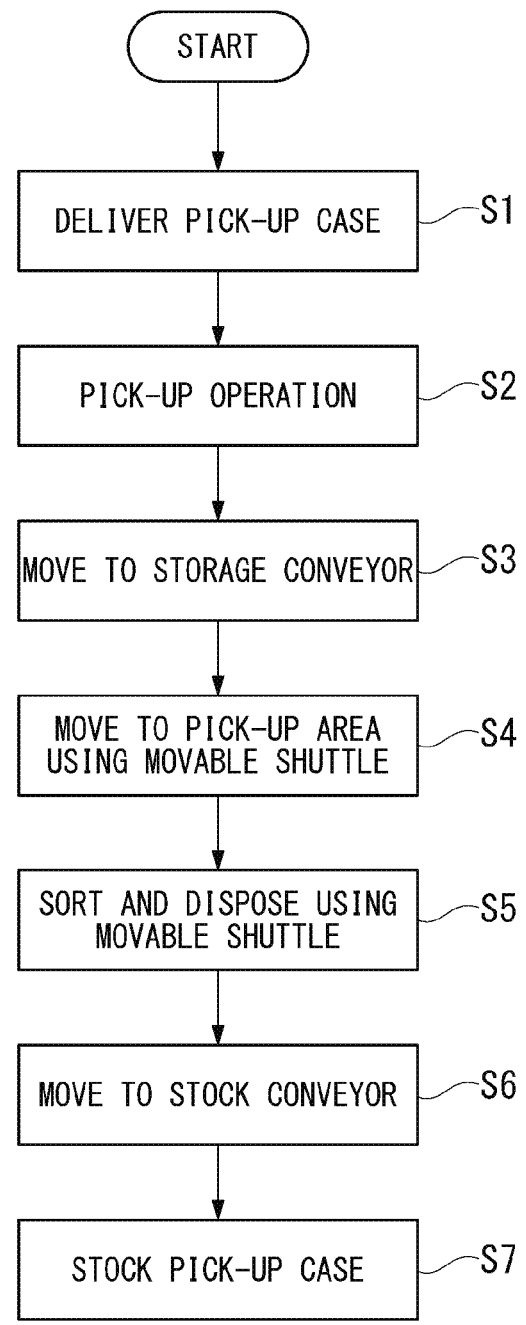
FIG. 3 is a flow chart showing operation of the buffer device according to the embodiment of the present disclosure.

An operation of the pick-up facility 1 of the present embodiment will be described with reference to FIG. 3. FIG. 3 is a flow chart showing the operation of the pick-up facility 1 of the present embodiment. In a state where the pick-up cases C required for the pick-up operation are not stored in the storage conveyors 2, the pick-up case C containing the articles to be picked up is transported from the automatic warehouse 100 to the pick-up transport unit 4 of the pick-up facility 1 based on the schedule stored in advance in a control device of the automatic warehouse 100 (step S1).

Next, the control unit 7 of the pick-up facility 1 controls the pick-up robot 5 to carry out the pick-up operation of transferring the articles from the pick-up case C to the cargo case S in the pick-up area 4b (step S2). The pick-up case C for which the pick-up operation of transferring the articles to the cargo case S has been completed is moved to the first storage conveyor 2a via the connection conveyor 4c (step S3). The first storage conveyor 2a and the second storage conveyor 2b are always moved toward the stock conveyor 6 by one pick-up case C. Therefore, the pick-up case C moved to the first storage conveyor 2a is gradually moved toward the stock conveyor 6 in the first storage conveyor 2a.

In a case where the pick-up case C disposed on the first storage conveyor 2a or the second storage conveyor 2b is needed again in the pick-up operation, the control unit 7 uses the movable shuttle 3 to move the target pick-up case C to the pick-up area 4b via the delivery conveyor 4a from the first storage conveyor 2a or the second storage conveyor 2b (step S4).

The pick-up case C for which the pick-up operation of transferring the articles to the cargo case S has been completed is moved again to the storage conveyors 2 via the connection conveyor 4c. In a case where the pick-up cases C are already disposed on the first storage conveyor 2a, as shown in FIG. 1, the pick-up cases C are alternately sorted and disposed to the first storage conveyor 2a and the second storage conveyor 2b (step S5). Additionally, in a case where the pick-up case C is required to be disposed on the second storage conveyor 2b, the pick-up case C is disposed at the upstream end of the second storage conveyor 2b by the movable shuttle 3. At this time, of the first storage conveyor 2a and the second storage conveyor 2b, the storage conveyor 2 in which the pick-up case C is newly disposed, moves the pick-up case C already placed thereon to the side of the stock conveyor 6 by one pick-up case. Therefore, a space in which one pick-up case C is placed is formed at the end (upstream end) on a side of the pick-up transport unit 4.

When the pick-up case C disposed on the storage conveyor 2 is moved to the end on the side of the stock conveyor 6, the pick-up case C is transported from the stock conveyor 6 to the automatic warehouse 100 (step S6). The pick-up case C is stocked again in the automatic warehouse 100 (step S7). The pick-up facility 1 repeatedly carries out steps S1 to S7 when carrying out the pick-up operation of transferring the articles to a plurality of the cargo cases S.

According to the present embodiment, the pick-up cases C for which the pick-up operation has been completed are arranged on the storage conveyors 2 in a last-in-first-out manner, and transported at a low speed toward the automatic warehouse 100. Consequently, the pick-up cases C frequently needed are always disposed in the vicinity of the pick-up area. Further, by transporting the pick-up cases C from the storage conveyors 2 to the pick-up transport unit 4 at high speed by the movable shuttle 3, the pick-up cases C can be efficiently and quickly supplied to the pick-up transport unit 4.

Further, according to the present embodiment, the pick-up facility 1 includes the first storage conveyor 2a and the second storage conveyor 2b as the storage conveyors 2. Consequently, the pick-up cases C can be stored in two storage conveyors. Therefore, compared with a case where only one storage conveyor 2 is provided, the containing capacity of the pick-up cases C of the storage conveyors 2 is improved, and the pick-up cases C can be efficiently stored.

Further, according to the present embodiment, the movable shuttles 3 are disposed with the first storage conveyor 2a and the second storage conveyor 2b interposed therebetween. Consequently, the movable shuttle 3 is close to both the first storage conveyor 2a and the second storage conveyor 2b, and a moving distance between the first storage conveyor 2a and the second storage conveyor 2b can be shortened. Therefore, the pick-up cases C can be supplied to the pick-up transport unit 4 more quickly.

Further, according to the present embodiment, the pick-up facility 1 includes the stock conveyor 6 connected to the first storage conveyor 2a and the second storage conveyor 2b, and the stock conveyor 6 can stock the pick-up cases C transported to the ends of the first storage conveyor 2a and the second storage conveyor 2b into the automatic warehouse 100 at a high speed. Consequently, the pick-up cases C can be quickly stocked in the automatic warehouse 100.

Further, according to the present embodiment, the pick-up cases C for which the pick-up operation has been completed are distributed to the first storage conveyor 2a and the second storage conveyor 2b to be disposed alternately. Consequently, in both the first storage conveyor 2a and the second storage conveyor 2b, a pick-up case for which the pick-up operation was completed most recently can be disposed at the end on the side of the pick-up transport unit 4.

The suitable embodiment of the present disclosure have been described with reference to the drawings, but the present disclosure is not limited to the embodiments stated above. The shapes, combinations, and the like of the constituent members shown in the embodiment stated above are merely examples, and various changes can be made based on design requirements and the like without departing from the spirit of the present disclosure.

Although a configuration in which two storage conveyors 2 are provided is employed in the preferred embodiment, the present disclosure is not limited thereto. It is also possible to employ a configuration in which one storage conveyor 2 is provided, and it is also possible to employ a configuration in which three or more storage conveyors 2 are provided.

Further, in the embodiment, although a configuration in which the pick-up cases C are sorted and disposed to the first storage conveyor 2a and second storage conveyor 2b by means of the movable shuttle 3 is employed, the present disclosure is not limited thereto. For example, it is possible to employ a configuration in which the pick-up cases C are sorted and disposed to the first storage conveyor 2a and second storage conveyor 2b by means of a conveyor, a crane or the like, provided between the first storage conveyor 2a and the second storage conveyor 2b.

Moreover, for example, it is possible to employ a configuration in which, in a case where the articles contained in the pick-up case C is refrigerated products or frozen products, the control unit 7 acquires a time from the delivery from the automatic warehouse 100 for each pick-up case C, and in a case where a predetermined time has elapsed since the pick-up case C is delivered, the pick-up case C is forcibly moved to the stock conveyor 6 by the movable shuttle 3. Consequently, undesired temperature rise of the articles contained in the pick-up case C can be suppressed.

Additionally, it is possible to employ a configuration in which the buffer device 10 further includes a containing unit connecting to a downstream side of the stock conveyor 6 and capable of containing multiple (a plurality of the) pick-up cases C, as a separate unit from the storage conveyors 2. The pick-up cases C for which the pick-up operation has been completed are temporarily stored in the containing unit via the storage conveyor 2 and the stock conveyor 6. The movable shuttle 3 takes out the pick-up cases C from the containing unit to the pick-up transport unit 4 based on, for example, the instruction from the control unit 7. In this case, the buffer device 10 can contain a plurality of the pick-up cases C. Further, the containing unit may be connected to the automatic warehouse 100, and may temporarily contain the pick-up cases C delivered from the automatic warehouse 100.

Moreover, in the embodiment, although a configuration in which the buffer device 10 is provided in the pick-up facility 1 for carrying out the pick-up operation by means of the robot 5 is employed, the present disclosure is not limited thereto. For example, it is also possible to employ a configuration in which the buffer device 10 is provided in the pick-up facility for carrying out manual pick-up operation.

INDUSTRIAL APPLICABILITY

According to the present disclosure, the article containers for which the pick-up operation has been completed are arranged in a last-in-first-out manner with respect to a movable storage apparatus, and are gradually transported to a warehouse. Accordingly, the article containers frequently needed are always disposed in the vicinity of the pick-up area. Furthermore, the article container can be efficiently and quickly supplied to the pick-up area by transporting the article container from the movable storage apparatus to the pick-up area at a high speed by a moving device.

What is claimed is:

1. A buffer device for temporarily storing at least one article container for containing an article to be picked up, comprising:
    at least one placing unit on which the at least one article container is placed and which is configured to transport the placed article container in a transport direction which is a direction away from a pick-up area;

a supply unit which supplies the at least one article container from the pick-up area to an end area on a side of the at least one placing unit close to the pick-up area;

a movable shuttle which includes a movable carriage unit and a transfer device, and a control unit which controls the buffer device to: hold an article container in the pick-up area for receiving one or more articles in the article container and thereafter to move the article container by the supply unit from the pick-up area to the upstream end of the first placing unit, and then to move the article container b: the first, placing unit from the upstream end to the downstream end of the first placing unit, wherein the movable carriage unit is configured to travel parallel to the transport direction and is configured for at least one article container to be placed thereon, the transfer device is configured to transfer the at least one article container at least between the at least one placing unit and the movable carriage unit, the movable shuttle is configured to travel parallel to the transport direction, the at least one article container includes a plurality of article containers, the movable shuttle is configured to travel to move each one of the plurality of article containers from the at least one placing unit to the pick-up area, and the control unit further is configured such that, where one or more additional articles are to be placed in the container after the article container is placed on the first placing unit and before the article container is moved to the downstream end of the first placing to move the article container by the movable shuttle from the first placing unit back toward the pick-up area for further pick-up of the one or more additional articles, and after the further pick-up to move the article container back to the upstream end of the first placing unit by the supply unit.

2. The buffer device according to claim 1, wherein the at east one placing unit includes a plurality of placing units.

3. The buffer device according to claim 2, wherein the plurality of placing units are disposed in parallel with each other in a state where a traveling area of the movable shuttle is interposed between two placing units adjacent to each other of the plurality of placing units.

4. The buffer device according to claim 1, further comprising:

a collect device which collects the plurality of article containers from a downstream end of the at least one placing unit which is downstream from the pick-up area.

5. The buffer device according to claim 1, further comprising:

a containing unit which contains the plurality of article containers and which is provided separately from the at least one placing unit.

6. The buffer device according to claim 1, wherein the at least one placing unit includes a first placing unit having an upstream end and a downstream end, and the side of the at least one placing unit close to the pick-up area is the upstream end of the first placing unit, such that the supply unit supplies article containers from the pick-up area to the upstream end of the first placing unit, and the first placing unit is configured to move containers from the upstream end to the downstream end of the first placing unit.

7. The buffer device according to claim 1, further comprising a second placing unit having a second placing unit upstream end and a second placing unit downstream end, and wherein the second placing unit is configured to move article containers from the second placing unit upstream end to the second placing unit downstream end, wherein the movable shuttle is positioned between the first placing unit and the second placing unit, and wherein the control unit is further configured to control the movable shuttle to move one or more article containers from the first placing unit to the second placing unit.

8. The buffer device according to claim 7, further comprising a stock conveyor downstream from the first and second placing units, and wherein the control unit is further configured to control the movable shuttle to move one or more article containers to the stock conveyor.

9. The buffer device according to claim 8, wherein the stock conveyor is further arranged to receive one or more article containers from the second placing unit downstream end of the first placing unit and the downstream end.

10. The buffer device according to claim 3, wherein the movable shuttle is further configured to move one or more article containers from one of the plurality of placing units to another of the plurality of placing units.

* * * * *